United States Patent [19]

Fujieda et al.

[11] Patent Number: 5,635,723
[45] Date of Patent: Jun. 3, 1997

[54] FINGERPRINT IMAGE INPUT APPARATUS

[75] Inventors: Ichiro Fujieda; Setsuo Kaneko, both of Tokyo, Japan

[73] Assignee: NEC Corporation, Tokyo, Japan

[21] Appl. No.: 578,496

[22] Filed: Dec. 26, 1995

[30] Foreign Application Priority Data

Dec. 26, 1994 [JP] Japan .................................. 6-322657

[51] Int. Cl.⁶ .................................................. G06K 11/00
[52] U.S. Cl. ............................................. 250/556; 382/127
[58] Field of Search ................................ 250/556, 208.1, 250/221; 382/124, 125, 126, 127

[56] References Cited

U.S. PATENT DOCUMENTS

| | | | |
|---|---|---|---|
| 4,429,413 | 1/1984 | Edwards | 382/4 |
| 4,577,345 | 3/1986 | Abramov | 382/4 |
| 5,325,442 | 6/1994 | Knapp | 382/4 |
| 5,429,006 | 7/1995 | Tamovi | 73/862.046 |
| 5,446,290 | 8/1995 | Fujieda et al. | 250/556 |

Primary Examiner—Edward P. Westin
Assistant Examiner—Alan L. Giles
Attorney, Agent, or Firm—Foley & Lardner

[57] ABSTRACT

A fingerprint image input apparatus comprises a plane light source for irradiating light having a two-dimensional light distribution and an approximately even luminance, a two-dimensional image sensor capable of allowing the light to pass through, and an optical part for guiding light from the plane light source, having passed the two-dimensional image sensor, to a finger and guiding light reflected at the finger to the photoelectric converting element. The two-dimensional image sensor includes a plurality of pixels arranged in a matrix form. A bias power source for supplying a bias voltage to the individual pixels, a scanning circuit for outputting a scan signal to the pixels and a first detecting circuit for detecting photoelectric data signals from the pixels are connected to those pixels via bias lines, scan lines and data lines. Connected to the bias lines are a signal generator for generating a finger detection signal to detect the contact of a finger with the optical part and a signal detecting circuit for detecting a change in the finger detection signal. A switch controller outputs a control signal in accordance with a finger detection mode and a fingerprint image input mode. According to the control signal, first and second switch circuits control the connection between the signal generator and the second detecting circuit.

7 Claims, 8 Drawing Sheets

FINGERPRINT IMAGE INPUT APPARATUS

BACKGROUND OF THE INVENTION

1. Field of the Invention

The present invention relates to a fingerprint image input apparatus, and, more particularly, to a fingerprint image input apparatus capable of directly inputting a fingerprint image from a finger without using ink.

2. Description of the Related Art

Various fingerprint image input apparatuses capable of directly inputting a fingerprint image from a finger without using ink have been proposed. For example, Unexamined Japanese Patent Publication No. Sho 58-201178 discloses a fingerprint image input apparatus which can acquire a fingerprint image of a finger pressed against a transparent body by using an optical system like a prism and a CCD camera. Hereinafter, this apparatus is called the first prior art.

FIG. 1 is an exemplary diagram showing a fingerprint image input apparatus according to the first prior art. This apparatus starts imaging upon detection of the pressure of a finger 50. When the finger 50 is pressed against a prism 51, the prism 51 presses pressure-sensitive sections 54 via associated springs 52 and metal fittings 53. Each pressure-sensitive section 54 sends a fingerprint detection signal to an AND gate 55 only when the applied pressure becomes equal to or greater than a given level or a given range. When all the pressure-sensitive sections 54 (for example, four pressure-sensitive sections) send fingerprint detection signals to the AND gate 55, an ON signal from the AND gate 55 is sent to a controller 58 which in turn drives a light source 56 and an fingerprint image sensor 57. A fingerprint image picked up in this manner is sent to another processing section from an interface 59 under the control of the controller 58.

Unexamined Japanese Patent Publication No. Sho 64-13677 discloses another type of fingerprint image input apparatus whose imaged fingerprint images have no distortion. This apparatus is hereinafter called the second prior art.

FIG. 2 is an exemplary cross-sectional view of a fingerprint image input apparatus according to the second prior art. In the second prior art, a curved glass body 61 whose inner wall and outer wall are concentrical is used as a transparent body against which a finger 60 is to be pressed. A one-dimensional image sensor 62 and an illuminator 63 for illumination over the imaging area of the one-dimensional image sensor 62 are fixed with such a positional relation as to satisfy the condition for full reflection at the inner wall of the curved glass body 61. The one-dimensional image sensor 62 has an optical fiber lens 64 which is so fixed as to focus on the inner wall of the curved glass body 61.

The curved glass body 61 is provided with a light-emitting diode 65 and a phototransistor 66 which are so arranged to face each other. When the finger 60 is placed on the inner wall of the curved glass body 61, light from the light-emitting diode 65 is blocked and the phototransistor 66 detects a change in light to thereby detect the presence of the finger 60.

Then, the one-dimensional image sensor 62 and the illuminator 63 move along the outer wall of the curved glass body 61 while satisfying the condition for full reflection at the inner wall of the curved glass body 61 to thereby pick up a fingerprint image.

Unexamined Japanese Patent Publication No. Hei 1-180685 discloses a fingerprint image input apparatus which has an improved finger detecting section. This apparatus is hereinafter called the third prior art.

FIG. 3 is a perspective view of a fingerprint image input apparatus according to the third prior art. In the third prior art, a plurality of transparent electrodes 71 and 72 are arranged in a comb shape on the inner wall of a curved glass body 70 so as to face each other without any contact. When a finger is placed on the inner wall of the curved glass body 70, sweat produced by the perspiration of the skin short-circuits the transparent electrodes 71 and 72. The presence of the finger is detected by this short-circuiting so that imaging can start.

Those conventional fingerprint image input apparatuses detect, as a fingerprint image, the difference between the amount of the reflected light from the portion of the transparent body with which a finger is in contact and that from the portion of the transparent body which is not touched with a finger, by using an optical system like a prism and a one-dimensional CCD sensor.

Those first to third prior arts use a combination of an image sensor, such as a television camera or one-dimensional CCD sensor, and an optical part such as a prism or a curved transparent body. Those apparatuses therefore become large and have large-scale structures.

Unexamined Japanese Patent Publication No. Sho 60-235456 discloses a close-contact type image sensor which has a high reliability and high resolution. This image sensor has at least one sensor having a multilayer structure. The image sensor is realized by forming a photodiode, made of an amorphous silicon (a-Si) as a base substance, on an insulating substrate, and forming a blocking diode, made of an amorphous silicon as a base substance, on this photodiode via a conductive amorphous silicon.

A similar sensor comprising amorphous silicon thin-film transistor, photodiodes having a p-i-n junction is disclosed in MRS Bulletin, Vol. 16, No. 11, p. 70–76 (1992).

U.S. Pat. No. 5,446,290 discloses a thin and compact finger print image input apparatus. FIG. 4 is a perspective view showing the fingerprint image input apparatus to which such an image sensor using amorphous silicon is adapted. This image sensor is hereinafter called the fourth prior art. As shown in FIG. 4, this fingerprint image input apparatus 5 comprises a plane light source 1, a two-dimensional image sensor 2 and an optical part 3.

FIG. 5 is a circuit diagram showing the structure of the image sensor 2 in FIG. 4. As shown in FIG. 5, the image sensor 2 comprises a plurality of pixels 10 arranged in a matrix form, a scanning circuit 16 for outputting scan signals to the individual pixels 10, scan lines 13 for transferring scan signals, bias lines 15 and 15a for applying a bias voltage to the individual pixels 10, data lines 14 for transferring the output signals of the individual pixels 10 and a detecting circuit 17 for detecting data from the data lines 14.

Each pixel 10 is constituted of a light-receiving element 11, made of a photodiode formed by a thin film of a-Si or the like, and a switch element 12, made of a thin-film transistor formed by a thin film of a-Si or the like.

In the thus constituted fingerprint image input apparatus 5, light emitted from the plane light source 1 passes through the clearances between the pixels 10 formed on the image sensor 2 and reaches the optical part 3. The path of the light is defined in such a way that the light obliquely hits a finger (not shown) placed on the optical part 3. Then, the light is reflected at the finger and is guided to the light-receiving elements 11 of the pixels 10 again through the optical part 3. Prior to detecting the reflected light, the individual light-receiving elements 11 are charged by the application of a reverse bias voltage via the bias lines 15 and 15a, and the individual switch elements 12 are set off. Therefore, the light-receiving elements 11 stand by, ready for the detection of light.

When the reflected light from the finger is absorbed by the light-receiving elements 11, the amount of the electric charges accumulated in the light-receiving elements 11 decreases in accordance with the charges produced by the reflected light. Then, the scanning circuit 16 simultaneously enables the switch elements 12 of an arbitrary row. Consequently, charges flow through the data lines 14 to those of the light-receiving elements 11 connected to the enabled switch elements 12 which are discharged by the light illumination. As the current is detected by the detecting circuit 17, the light-receiving elements 11 which are irradiated with light can be detected. By performing a similar operation for all the rows, a two-dimensional image as the distribution of the reflected light from the finger can be read out.

If the presence of a finger on the fingerprint image input apparatus 5 is automatically detected in the fourth embodiment, a stable image can be obtained. As the image input is automatically initiated, the operability is improved. A touchpanel input apparatus capable of detecting the contact of a finger by using electrostatic capacitors is disclosed in Unexamined Japanese Patent Publication No. Hei 5-335925.

FIG. 6 is an exemplary diagram showing the structure of the conventional touchpanel input apparatus. A plurality of electrodes 104a, 104b and 104c are formed on a glass substrate 100, with a protective film 103 formed on the top of those electrodes 104a, 104b and 104c. The individual electrodes 104a, 104b and 104c are connected via an impedance element 106 to a voltage generator 105.

When a finger 101 touches the protective film 103 directly above the electrode 104b of the thus constituted touchpanel input apparatus, for example, a parasitic capacitor Cm of the human body and a parasitic capacitor Cn between the selected electrode 104b and the finger 101 are connected in series, and these capacitors and a fixed capacitor (or parasitic capacitor) Cp of the selected electrode 104b are connected in parallel so that the combined capacitance increases. Therefore, a voltage $V_{out}$ across both ends of the fixed capacitor Cp is influenced by the presence of a finger. As a change in the terminal voltage $V_{out}$ is measured, the touched electrode can be identified.

To incorporate any of the finger detecting means of the first to third prior arts (the use of the electrostatic capacitor, the pressure detection, the use of light reflection and the detection of electric short-circuiting) into the image input apparatus of the fourth prior art, however, those detecting means should be provided at finger-touching portions (optical part 3). This design deteriorates the close contactability between the optical part 3 and a finger, thus degrading the image quality.

While the pressure detecting means is attachable to the back of the sensor, this design should sacrifice the flatness and compactness of the apparatus.

If finger detecting means is attached to each image sensor, the manufacturing cost is inevitably increased.

SUMMARY OF THE INVENTION

Accordingly, it is an object of the present invention to provide a compact fingerprint image input apparatus with an excellent operability, a simple structure and a reduced manufacturing cost.

The fingerprint image input apparatus according to this invention comprises:

a plane light source for irradiating light having a two-dimensional light distribution and an approximately even luminance;

a two-dimensional image sensor capable of allowing the light to pass through, the two-dimensional image sensor including, a plurality of pixels arranged in a matrix form, each pixel having a photoelectric converting element for outputting a photoelectric signal in response to incident light, and a switch element for transferring the photoelectric signal as a photoelectric data signal;

bias lines for applying a bias voltage to the photoelectric converting elements, the bias lines being connected to the pixels;

scan lines for transferring a scan signal to the switch elements, the scan lines being connected to the pixels;

data lines for transferring photoelectric data signals from the switch elements, the data lines being connected to the pixels;

a bias power source for supplying the bias voltage;

a scanning circuit for outputting the scan signal;

a first detecting circuit for detecting the photoelectric data signal;

a signal generator for generating a finger detection signal to detect contact of a finger with the two-dimensional image sensor;

a second detecting circuit for detecting a change in the finger detection signal;

a switch controller for outputting a control signal in accordance with a finger detection mode and a fingerprint image input mode;

a first switch circuit for controlling connection between the bias lines and the second detecting circuit or the bias power source in accordance with the control signal; and a second switch circuit for controlling connection between the signal generator and the bias lines in accordance with the control signal; and an optical part for guiding light from the plane light source, having passed the two-dimensional image sensor, to a finger and guiding light reflected at the finger to the photoelectric converting element.

Either the first switch circuit or the second switch circuit in this fingerprint image input apparatus may be incorporated in the two-dimensional image sensor.

The fingerprint image input apparatus embodying this invention uses the bias lines, scan lines or data lines as a finger detecting circuit. As the finger detecting circuit need not be prepared separately from the circuitry of the image sensor, the fingerprint image input apparatus can be designed compact with a reduced manufacturing cost. Because the inputting of a fingerprint image is automatically initiated after detecting a finger, the apparatus has a high operability. Further, because of fewer parts needed, the apparatus becomes compact and the manufacturing cost becomes lower.

DETAILED DESCRIPTION OF THE PREFERRED EMBODIMENTS

Preferred embodiments of the present invention will now be described specifically with reference to the accompanying drawings.

Figure 1:
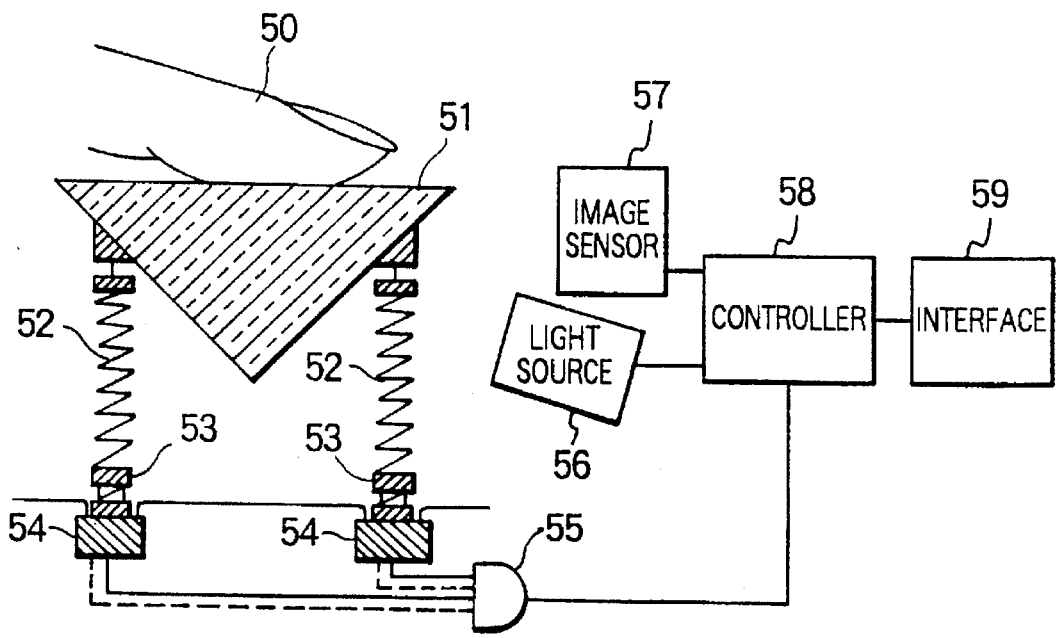
FIG. 1 is an exemplary diagram showing a fingerprint image input apparatus according to the first prior art.
Figure 2:
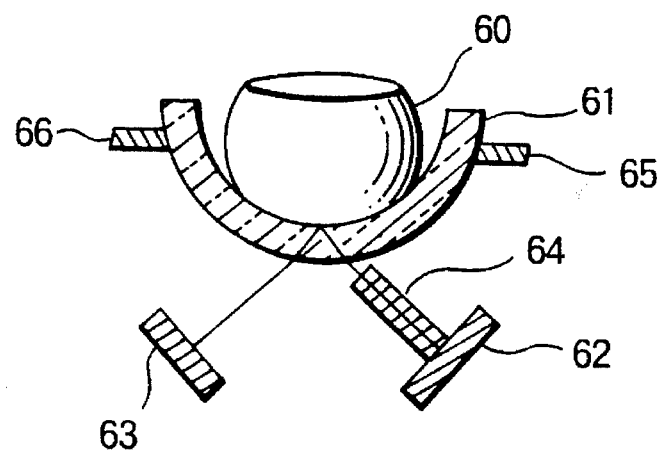
FIG. 2 is an exemplary diagram showing a fingerprint image input apparatus according to the second prior art.
Figure 3:
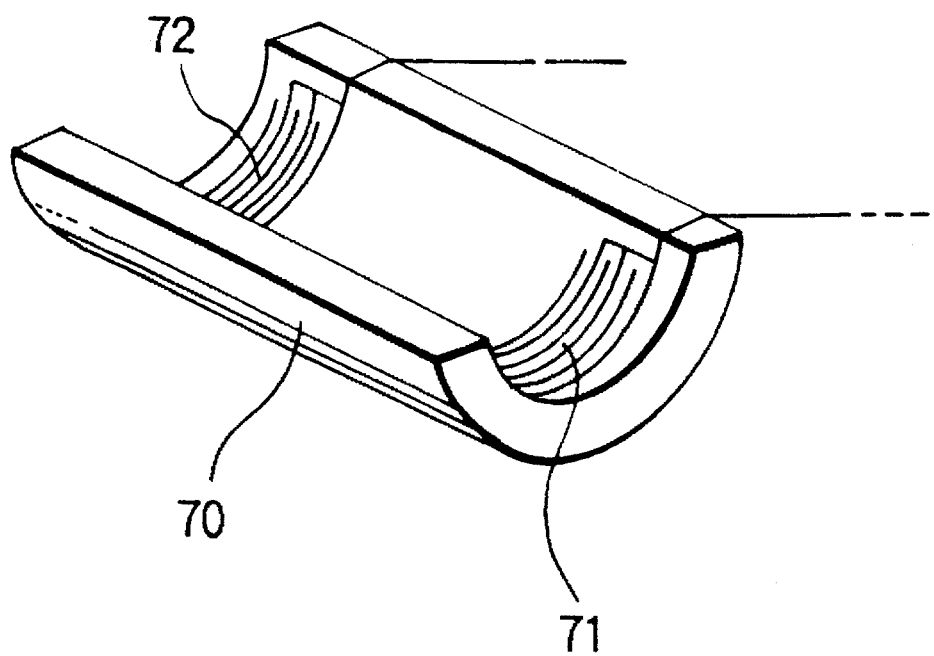
FIG. 3 is an exemplary diagram showing a fingerprint image input apparatus according to the third prior art.
Figure 4:
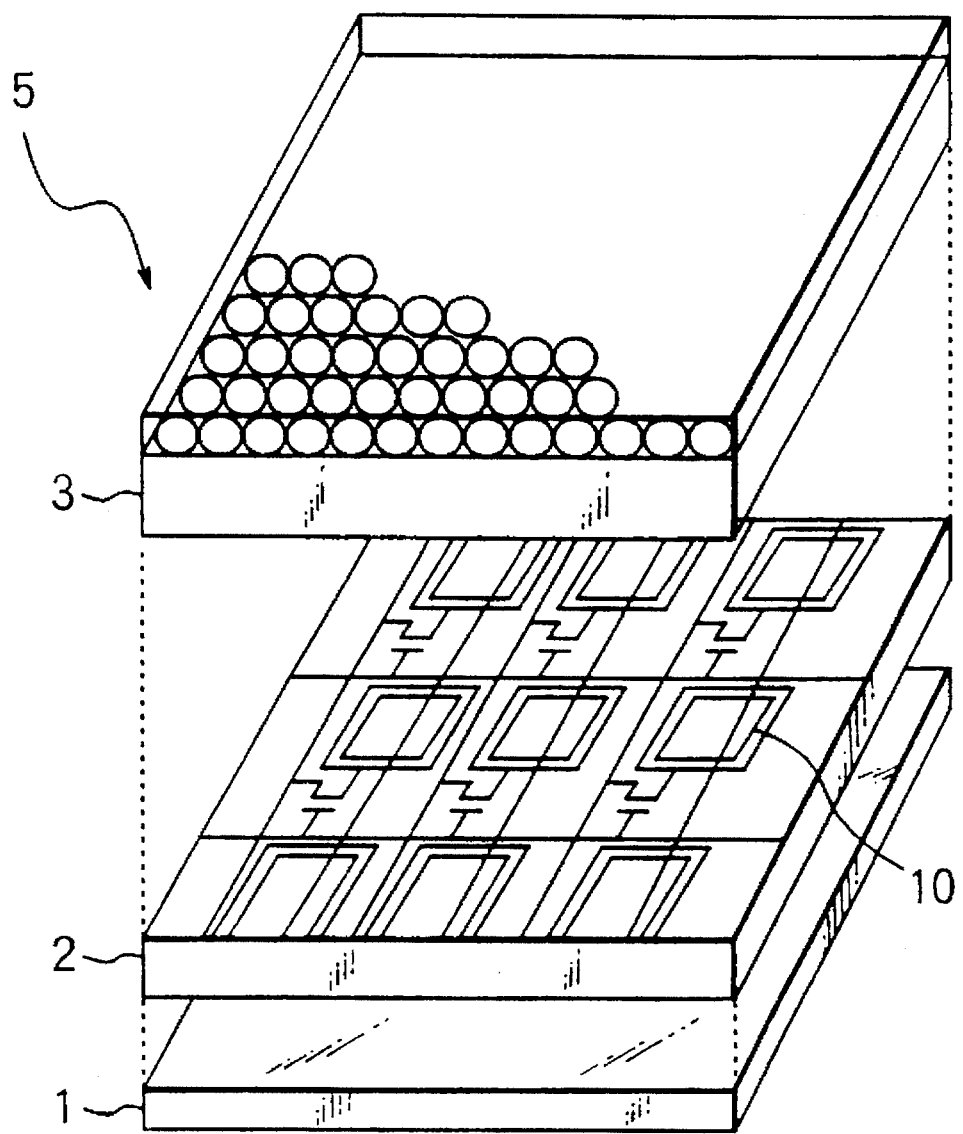
FIG. 4 is a perspective view of a fingerprint image input apparatus to which an image sensor using amorphous silicon is adapted.
Figure 7:
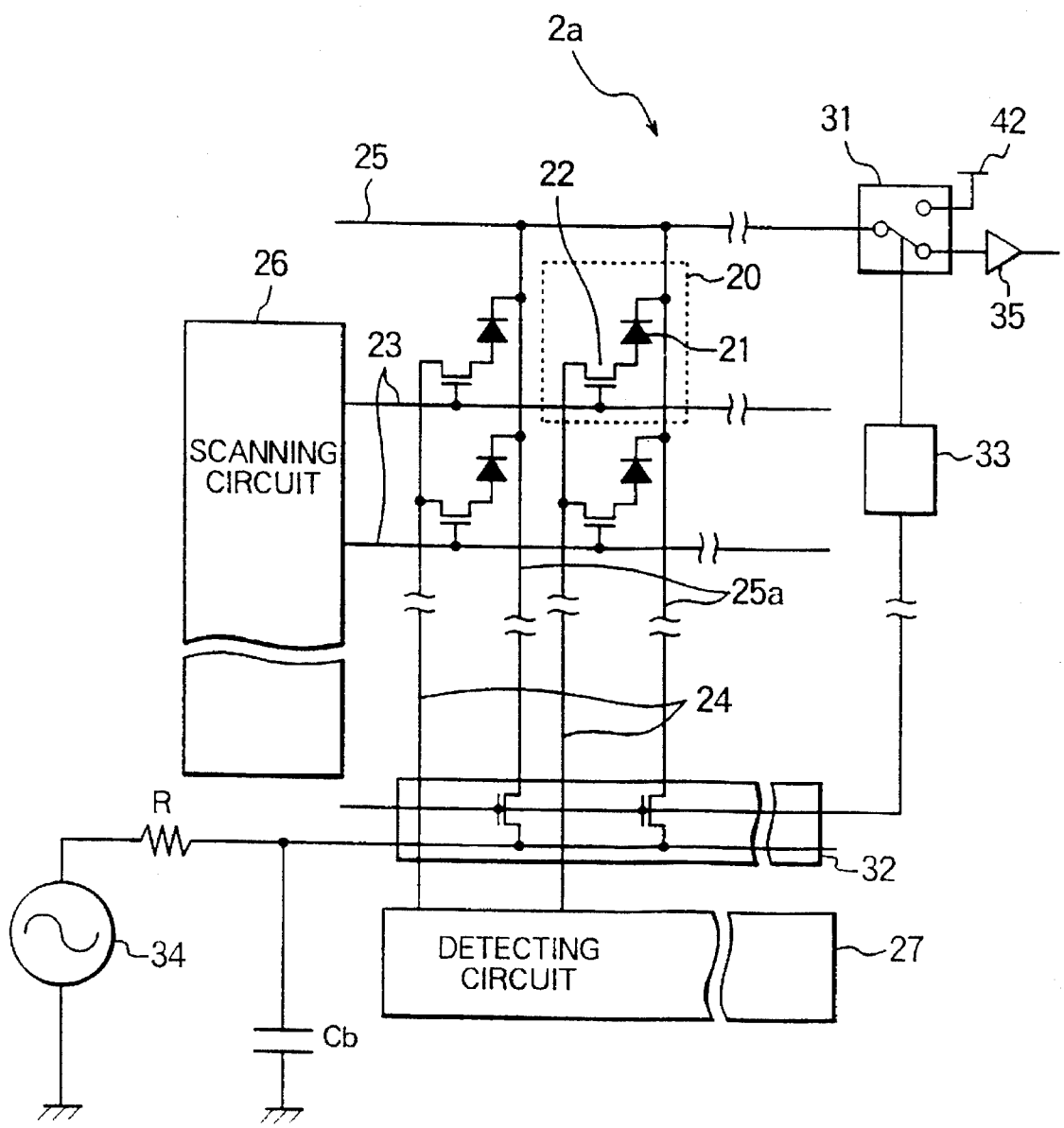
FIG. 7 is a circuit diagram showing the structure of an image sensor in a fingerprint image input apparatus according to the first embodiment of this invention.

FIG. 7 presents a circuit diagram showing the structure of an image sensor in a fingerprint image input apparatus according to the first embodiment of this invention. This image sensor 2a may be used in place of the image sensor 2 of the fingerprint image input apparatus 5 shown in FIG. 4.

The image sensor 2a of this embodiment has a plurality of pixels 20 arranged in a matrix form. Each pixel 20 comprises a light-receiving element (photoelectric converting element) 21 and a switch element 22. A single scan line 23 from a scanning circuit 26 for outputting a scan signal to the switch elements 22 is connected to each row of pixels 20. Thus, a plurality of scan lines 23 are provided row by row and are connected to the associated rows of pixels 20. Each scan line 23 is connected to the gates of MOS transistors each constituting the switch element 22 of the associated pixel 20.

A single data line 24 for transferring the output signals (photoelectric data signals) of the associated pixels 20 is connected to each column of pixels 20. That is, a plurality of data lines 24 are laid out column by column and are connected to the associated columns of pixels 20. Each data line 24 is connected to the sources or drains of MOS transistors each constituting the switch element 22 of the associated pixel 20. Those data lines 24 are also connected to a detecting circuit (first detecting circuit) 27 which detects the current that flows through the data lines 24.

A single bias line 25a is connected to the light-receiving elements 21 of each column of pixels 20. The bias lines 25a equal in number to the number of the columns are connected via a single bias line 25 to a first switch circuit 31. Also connected to this first switch circuit 31 are a bias power source 42 for supplying a bias voltage to the light-receiving elements 21 and a signal detecting circuit (second detecting circuit) 35 so that either the bias power source 42 or the signal detecting circuit 35 is connected to the bias lines 25 and 25a. It is a fingerprint detection mode when the bias power source 42 is connected to the bias lines 25 and 25a, and it is a finger detection mode when the signal detecting circuit 35 is connected to the bias lines 25 and 25a.

The columns of bias lines 25a are connected to a second switch circuit 32 to which a signal generator 34 is connected. When the transistor switch of the second switch circuit 32 is turned on (finger detection mode), the signal output from the signal generator 34 is supplied to the bias lines 25a.

The switching operations of the first switch circuit 31 and the second switch circuit 32 are controlled in responsive to each other by a switch controller 33.

When the switch element 22 in the image sensor 2a is formed of a thin-film transistor, parts of the first switch circuit 31, the second switch circuit 32, the switch controller 33, the signal generator 34 and the signal detecting circuit 35 can be constituted of thin-film transistors of a similar type to that of the switch element 22.

Figure 8:
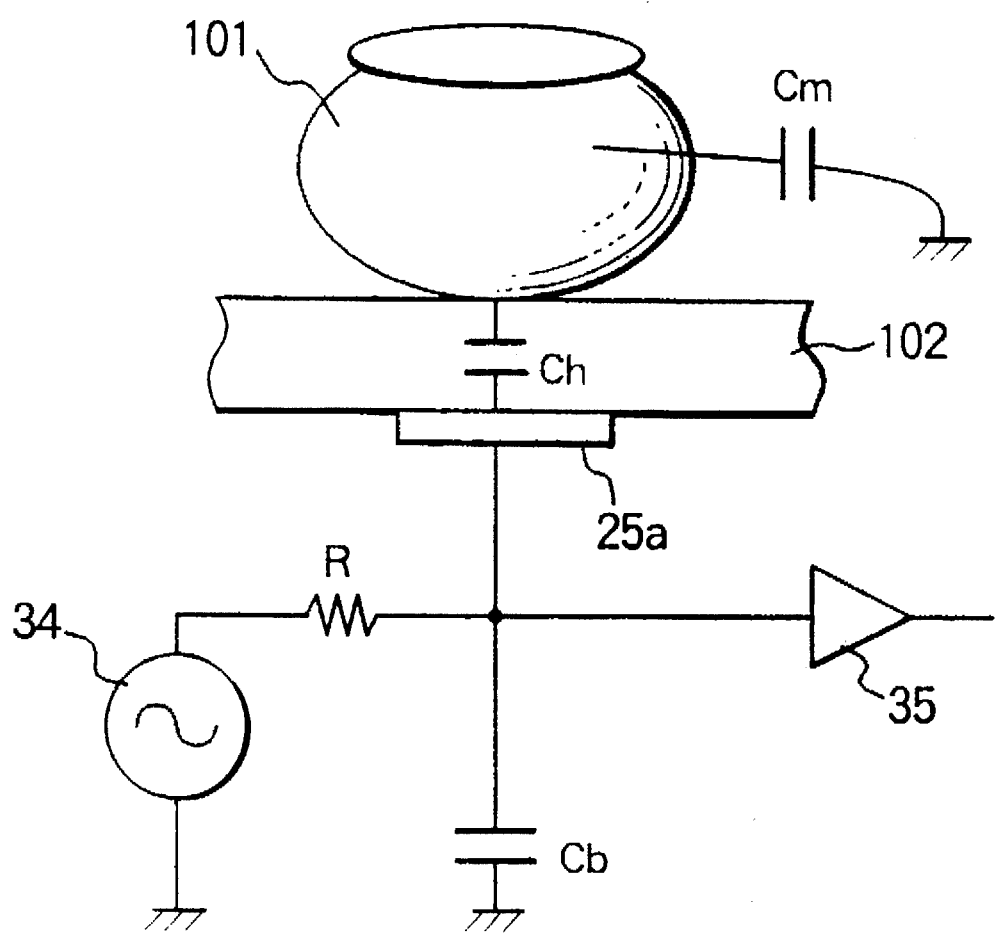
FIG. 8 is an exemplary diagram illustrating the operation in a finger detection mode according to the first embodiment.

FIG. 8 presents an exemplary diagram illustrating the operation in a finger detection mode according to the first embodiment. Formed at the back of a transparent substrate 102 are the bias lines 25a shown in FIG. 7 to which the signal generator 34 and the signal detecting circuit 35 are connected. FIG. 8 shows an equivalent circuit indicating the load of the parasitic capacitor of each bias line 25a as "Cb" and the wiring resistor of each bias line 25a as "R."

In finger detection mode, first, the potentials of all the scan lines 23 are set to a given value by the scanning circuit 26 so that the switch elements 22 of all the pixels 20 are in off-state. Then, the signal generator 34 is connected to the signal detecting circuit 35 by the first and second switch circuits 31 and 32. This signal generator 34 normally transmits a signal to the signal detecting circuit 35 and the parasitic capacitor Cb is present in the bias line 25a.

When a finger 101 is placed on the transparent substrate 102, electrostatic capacitors Ch are produced between the finger 101 and the bias lines 25a. Also, a parasitic capacitor Cm of the human body is present. Therefore, a series circuit of each electrostatic capacitor Ch of the transparent substrate 102 and the parasitic capacitor Cm of the human body is connected in parallel to the parasitic capacitor Cb of the bias line 25a. Accordingly, the combined capacitance of the bias lines 25a increases. As the signal waveform varies in the form of the attenuation of a sine wave or the rise/fall time of a square wave, therefore, the placement of the finger 101 can be detected by reading this change by the signal detecting circuit 35.

Figure 5:
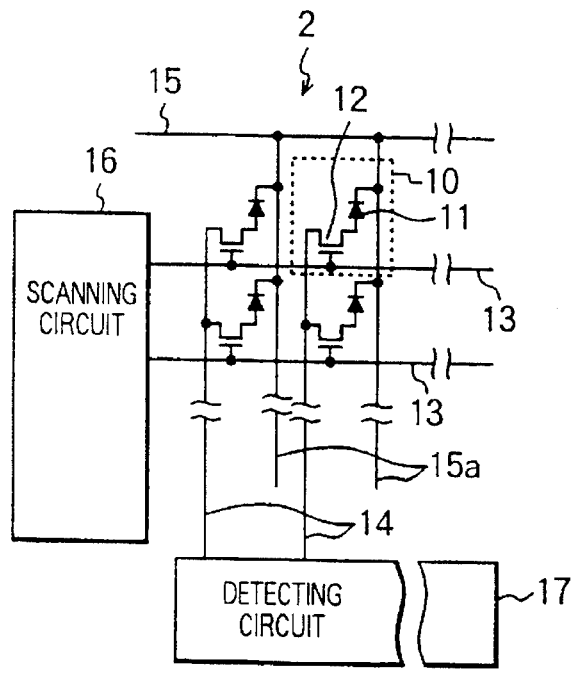
FIG. 5 is a circuit diagram showing the structure of an image sensor 2 in FIG. 4.
Figure 6:
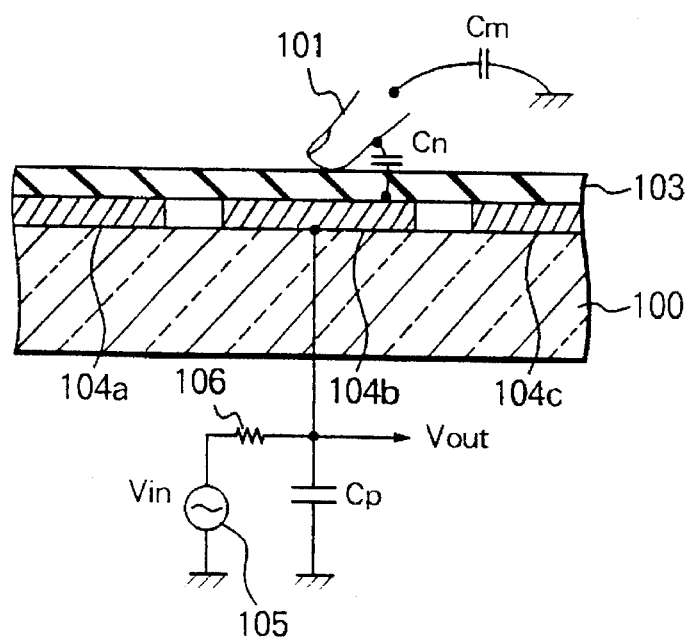
FIG. 6 is an exemplary diagram showing the structure of a conventional touchpanel input apparatus.

After finger detection, the switch controller 33 drives the first switch circuit 31 to connect the bias power source 42 to the bias line 25 and drives the second switch circuit 32 to disconnect the bias lines 25a and the signal generator 34. The resultant structure becomes the same as that of the image sensor 2 shown in FIG. 5 so that the distribution of the reflected light from the finger can be read as a two-dimensional image by the detecting circuit 27.

This invention is not limited to the first embodiment, but may be modified in various other forms. For instance, the switch circuit for switching between the finger detection mode and the image input mode may be connected to the scan lines or data lines instead of the bias lines.

Figure 9:
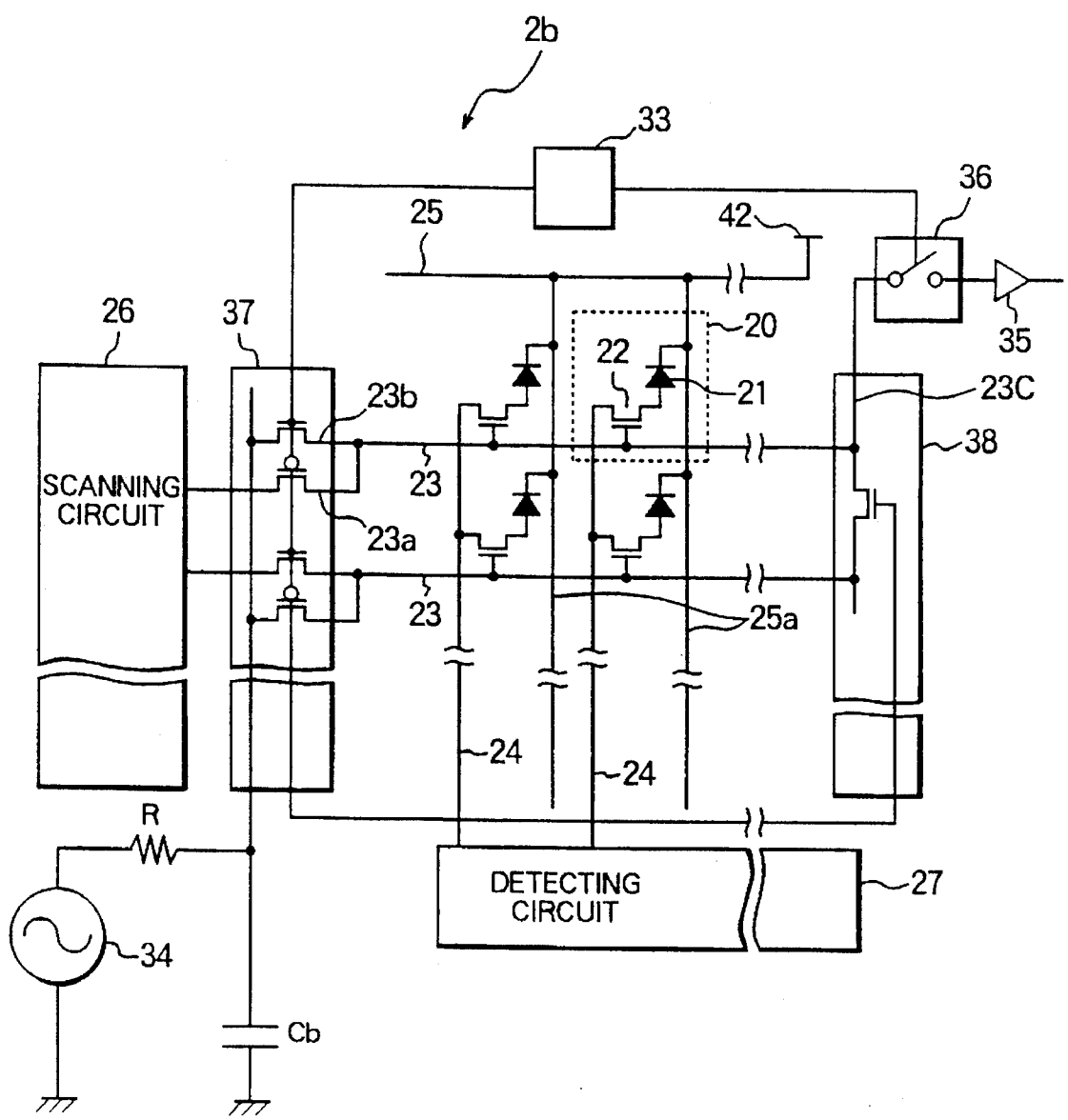
FIG. 9 is a circuit diagram showing the structure of an image sensor in a fingerprint image input apparatus according to the second embodiment.
Figure 10:
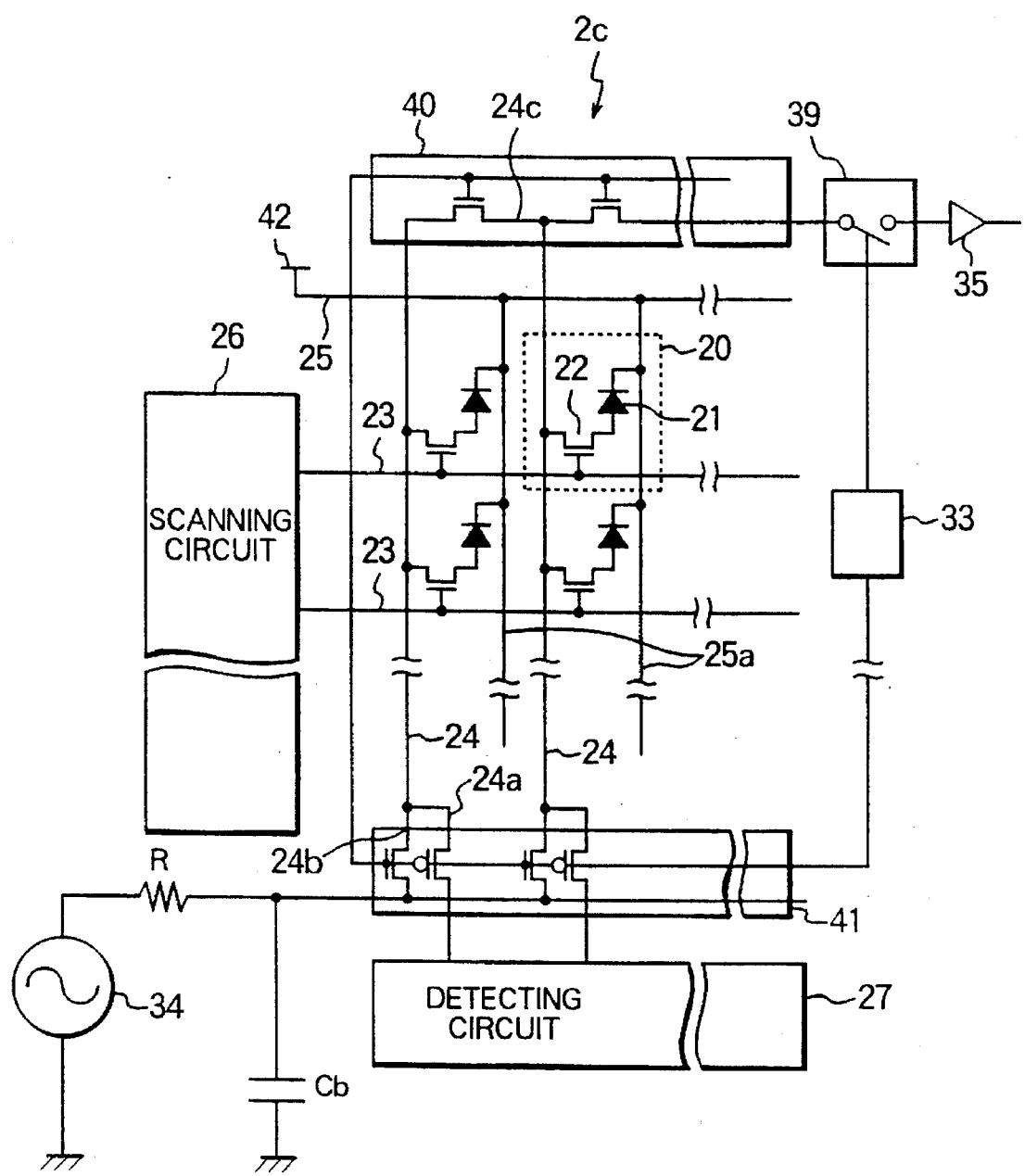
FIG. 10 is a circuit diagram showing the structure of an image sensor in a fingerprint image input apparatus according to the third embodiment.

FIG. 9 presents a circuit diagram showing the structure of an image sensor in a fingerprint image input apparatus according to the second embodiment of this invention, and FIG. 10 presents a circuit diagram showing the structure of an image sensor in a fingerprint image input apparatus according to the third embodiment of this invention. Like or same reference numerals or symbols as used in FIG. 7 are also used in FIGS. 9 and 10 to denote corresponding or identical components so that their detailed descriptions will be omitted.

As shown in FIG. 9, a switch circuit for switching between the finger detection mode and the image input mode is connected to the scan lines 23 in an image sensor 2b. Each scan line 23 is separated to two scan lines 23a and 23b on the scanning circuit side, one scan line 23a being connected to the scanning circuit 26 while the other scan line 23b is connected to the signal generator 34. Connected to the scan lines 23a and 23b is a second switch circuit 37 which controls the connection between each scan line 23 and the scanning circuit 26 or the signal generator 34.

The scan lines 23 are connected to the signal detecting circuit 35 via a single scan line 23c. Connected to the scan line 23c are a first switch circuit 36 which controls the connection between each scan line 23 and the signal detecting circuit 35, and a third switch circuit 38 which controls the connection of the scan lines 23 to one another. The switching operations of the first switch circuit 36, the second switch circuit 37 and the third switch circuit 38 are controlled in responsive to one another by the switch controller 33.

In finger detection mode, first, the potentials of all the scan lines 23 are set to a given value by the scanning circuit 26 so that the switch elements 22 of all the pixels 20 are in off-state. Then, the signal generator 34 is connected to the signal detecting circuit 35 via the scan lines 23, 23b and 23c by the first, second and third switch circuits 36, 37 and 38. At this time, a capacitor Cb is present in the scan lines 23 as same as the first embodiment shown in FIG. 7. If a finger approaches the scan lines 23, therefore, a parasitic capacitance Cm added to Cb so that the signal detecting circuit 35 can detect the contact of the finger.

After finger detection, the switch controller 33 drives the second switch circuit 37 in such a manner that the scanning circuit 26 is connected via the scan lines 23a and 23 to the individual pixels 20 and the signal generator 34 is disconnected from the scan lines 23. The switch controller 33 also drives the third switch circuit 38 in such a manner that the individual scan lines 23 are not connected to one another. The subsequent operation is the same as that of the first embodiment.

As shown in FIG. 10, a switch circuit for switching between the finger detection mode and the image input mode is connected to the data lines 24 in an image sensor 2c. Each data line 24 is separated to two data lines 24a and 24b on the side of the detecting circuit 27, one data line 24a being connected to the detecting circuit 27 while the other data line 24b is connected to the signal generator 34. Connected to the data lines 24a and 24b is a second switch circuit 41 which controls the connection between each data line 24 and the detecting circuit 27 or the signal generator 34.

The data lines 24 are connected to the signal detecting circuit 35 via a single data line 24c. Connected to the data line 24c are a first switch circuit 39 which controls the connection between each data line 24 and the signal detecting circuit 35 and a third switch circuit 40 which controls the connection of the data lines 24 to one another. The switching operations of the first switch circuit 39, the second switch circuit 41 and the third switch circuit 40 are controlled in responsive to one another by the switch controller 33.

The operations in the finger detection mode and fingerprint image input mode are almost the same as those of the second embodiment.

By using the bias lines, scan lines or data lines and without forming a finger detecting circuit separately from the sensor circuitry, it is possible to provide a compact and high-operability fingerprint image input apparatus whose manufacturing cost can be reduced.

Although the detecting circuit 27 and the first switch circuit 31 are described as separate units in FIG. 7, the first switch circuit 31 may be incorporated in the detecting circuit 27. It should therefore be apparent to those skilled in the art that various kinds of circuit structures may be adapted without departing from the spirit or scope of the invention.

What is claimed is:

1. A fingerprint image input apparatus comprising:
   a plane light source for irradiating light having a two-dimensional light distribution and an approximately even luminance;
   a two-dimensional image sensor capable of allowing said light to pass through, said two-dimensional image sensor including,
      a plurality of pixels arranged in a matrix form, each pixel having
         a photoelectric converting element for outputting a photoelectric signal in response to incident light, and
         a switch element for transferring said photoelectric signal as a photoelectric data signal;
      bias lines for applying a bias voltage to said photoelectric converting elements, said bias lines being connected to said pixels;
      scan lines for transferring a scan signal to said switch elements, said scan lines being connected to said pixels;
      data lines for transferring photoelectric data signals from said switch elements, said data lines being connected to said pixels;
   a bias power source for supplying said bias voltage;
   a scanning circuit for outputting said scan signal;
   a first detecting circuit for detecting said photoelectric data signal;
   a signal generator for generating a finger detection signal to detect contact of a finger with said two-dimensional image sensor;
   a second detecting circuit for detecting a change in said finger detection signal;
   a switch controller for outputting a control signal in accordance with a finger detection mode and a fingerprint image input mode;
   a first switch circuit for controlling connection between said bias lines and said second detecting circuit or said bias power source in accordance with said control signal; and
   a second switch circuit for controlling connection between said signal generator and said bias lines in accordance with said control signal; and
   an optical part for guiding light from said plane light source, having passed said two-dimensional image sensor, to a finger and guiding light reflected at said finger to said photoelectric converting element.

2. The fingerprint image input apparatus according to claim 1, wherein either said first switch circuit or said second switch circuit is incorporated in said first detecting circuit.

3. A fingerprint image input apparatus comprising:
   a plane light source for irradiating light having a two-dimensional light distribution and an approximately even luminance;
   a two-dimensional image sensor capable of allowing said light to pass through, said two-dimensional image sensor including,
      a plurality of pixels arranged in a matrix form, each pixel having
         a photoelectric converting element for outputting a photoelectric signal in response to incident light, and a switch element for transferring said photoelectric signal as a photoelectric data signal;

bias lines for applying a bias voltage to said photoelectric converting elements, said bias lines being connected to said pixels;

scan lines for transferring a scan signal to said switch elements, said scan lines being connected to said pixels;

data lines for transferring photoelectric data signals from said switch elements, said data lines being connected to said pixels;

a bias power source for supplying said bias voltage;

a scanning circuit for outputting said scan signal;

a first detecting circuit for detecting said photoelectric data signal;

a generator for generating a finger detection signal to detect contact of a finger with said two-dimensional image sensor;

a second detecting circuit for detecting a change in said finger detection signal;

a switch controller for outputting a control signal in accordance with a finger detection mode and a fingerprint image input mode;

a first switch circuit for controlling connection between said scan lines and said second detecting circuit in accordance with said control signal; and a second switch circuit for controlling connection between said signal generator or said scanning circuit and said scan lines in accordance with said control signal; and an optical part for guiding light from said plane light source, having passed said two-dimensional image sensor, to a finger and guiding light reflected at said finger to said photoelectric converting element.

4. The fingerprint image input apparatus according to claim 3, further comprising a third switch circuit for controlling connection of said scan lines to one another.

5. The fingerprint image input apparatus according to claim 3, wherein either said first switch circuit or said second switch circuit is incorporated in said scanning circuit.

6. A fingerprint image input apparatus comprising:

a plane light source for irradiating light having a two-dimensional light distribution and an approximately even luminance;

a two-dimensional image sensor capable of allowing said light to pass through, said two-dimensional image sensor including, a plurality of pixels arranged in a matrix form, each pixel having a photoelectric converting element for outputting a photoelectric signal in response to incident light, and a switch element for transferring said photoelectric signal as a photoelectric data signal;

bias lines for applying a bias voltage to said photoelectric converting elements, said bias lines being connected to said pixels;

scan lines for transferring a scan signal to said switch elements, said scan lines being connected to said pixels;

data lines for transferring photoelectric data signals from said switch elements, said data lines being connected to said pixels;

a bias power source for supplying said bias voltage;

a scanning circuit for outputting said scan signal;

a first detecting circuit for detecting said photoelectric data signal;

a signal generator for generating a finger detection signal to detect contact of a finger with said two-dimensional image sensor;

a second detecting circuit for detecting a change in said finger detection signal;

a switch controller for outputting a control signal in accordance with a finger detection mode and a fingerprint image input mode;

a first switch circuit for controlling connection between said data lines and said second detecting circuit in accordance with said control signal; and a second switch circuit for controlling connection between said signal generator or said first detecting circuit and said data lines in accordance with said control signal; and an optical part for guiding light from said plane light source, having passed said two-dimensional image sensor, to a finger and guiding light reflected at said finger to said photoelectric converting element.

7. The fingerprint image input apparatus according to claim 6, further comprising a third switch circuit for controlling connection of said data lines to one another.

* * * * *

UNITED STATES PATENT AND TRADEMARK OFFICE
CERTIFICATE OF CORRECTION

PATENT NO.        : 5,635,723
APPLICATION NO.   : 08/578496
DATED             : June 3, 1997
INVENTOR(S)       : Ichiro Fujieda and Setsuo Kaneko Page 1 of 1

It is certified that error appears in the above-identified patent and that said Letters Patent is hereby corrected as shown below:

Title Page, under REFERENCES CITED at (56):

Add the following references:
US4290061
JP60-235456
JP58-201178
JP05-335925
JP01-180685
JP01-013677
Street. "Amorphous Silicon Electronics", MRS Bulletin Vol. 17, No. 11, pp. 70-76 November 1992.

Signed and Sealed this
Nineteenth Day of July, 2011

David J. Kappos
*Director of the United States Patent and Trademark Office*